(12) United States Patent
Hong

(10) Patent No.: US 8,036,947 B2
(45) Date of Patent: Oct. 11, 2011

(54) SYSTEM AND METHOD FOR DIFFERENTIAL PAYMENT

(76) Inventor: Sung-Chan Hong, Seoul (KR)

( * ) Notice: Subject to any disclaimer, the term of this patent is extended or adjusted under 35 U.S.C. 154(b) by 108 days.

(21) Appl. No.: 12/530,305

(22) PCT Filed: Apr. 10, 2008

(86) PCT No.: PCT/KR2008/002009
§ 371 (c)(1),
(2), (4) Date: Sep. 8, 2009

(87) PCT Pub. No.: WO2008/123748
PCT Pub. Date: Oct. 16, 2008

(65) Prior Publication Data
US 2010/0094720 A1    Apr. 15, 2010

(30) Foreign Application Priority Data
Apr. 10, 2007    (KR) .................. 10-2007-0035063

(51) Int. Cl.
*G06Q 30/00*    (2006.01)
(52) U.S. Cl. ..................................... 705/26.1
(58) Field of Classification Search .............. 705/26, 705/27, 26.1
See application file for complete search history.

(56) References Cited

U.S. PATENT DOCUMENTS
7,657,479 B2 *    2/2010    Henley ........................... 705/37

FOREIGN PATENT DOCUMENTS
| KR | 10-2000-0037430 | 7/2000 |
| KR | 10-2000-0050014 | 8/2000 |
| KR | 10-2001-0104180 | 11/2001 |
| KR | 10-2002-0037435 | 5/2002 |
| KR | 10-2005-0091203 | 9/2005 |

OTHER PUBLICATIONS

Business Editors, Business Wire. New York: Feb. 17, 2000. p. 1; "Scribona Makes a Capital Gain of MSEK 33" http://proquest.umi.com/pqdweb?did=52114652&sid=5&Fmt=3&clientId=19649&RQT=309&VName=PQD.*
International Search Report-PCT/KR2008/002009 dated Jun. 20, 2008.

* cited by examiner

*Primary Examiner* — Mila Airapetian
(74) *Attorney, Agent, or Firm* — Cantor Colburn LLP

(57) ABSTRACT

Provided is a differential payment system connected to both a supplier terminal of a supplier providing a service and a purchaser terminal of a purchaser purchasing the service though a network, to differentially pay for the service based on an evaluation data of the service provided by the supplier.

6 Claims, 6 Drawing Sheets

Fig. 5

TOUR PACKAGE BILL PAGE (FOR SUPPLIER)

SUPPLIER ID : _____
BUSINESS No : _____
NAME OF PACKAGE : _____

PURCHASER ID : _____
NAME OF PURCHASER : _____

PAYMENT DUE DATE : __/__/__
PRE-INSTALLMENT RATE : 75 %
PRE-INSTALLMENT RATE : ___ (OFFER)
PAYMENT METHOD : CASH

[ SERVICE LIST FOR BILL ]

| CLASSIFICATION | DETAIL | UNIT PRICE | QUANTITY | PRICE | SERVICE PERIOD | REMARK |
|---|---|---|---|---|---|---|
| AIR FARE | RETURN FARE BETWEEN INCHEON AND PHILIPPIN | - | 2 | - | 3.1 ~ 3.5 | KOREAN AIR, PER 2 PEOPLE |
| HOTEL BILL | PHILIPPIN HOTEL | - | 4 | - | 3.1 ~ 3.5 | PER 4 NIGHTS (PER 2 PEOPLE) |
| LOCAL TRAFFIC EXPENSE | MINI VAN | - | 4 | - | 3.1 ~ 3.5 | PER 4 DAYS |
| GUIDE FEE | LOCAL GUIDE FEE | - | 4 | - | 3.1 ~ 3.5 | PER 4 DAYS, FREE CHARGE |
| TOTAL | | - | - | ₩2,000,000 | | WITH VAT |

[ SERVICE LIST EXCULDED FROM BILL - LOCAL OPTIONAL ITEMS ]

| CLASSIFICATION | DETAIL | UNIT PRICE | QUANTITY | PRICE | SERVICE PERIOD | REMARK |
|---|---|---|---|---|---|---|
| FOLK VILLAGE | ADMISSION FEE / GUIDE / EXTRA FEE | 100 | 1 | 100 | 3.1 ~ 3.5 | PER PERSON, $ |
| DINNER CRUISE | ADMISSION FEE / SUPPER FEE | 100 | 1 | 100 | 3.1 ~ 3.5 | PER PERSON, $ |
| TOTAL | | - | - | | | |

CANCEL    BILL

Fig. 6

TOUR PACKAGE PAYMENT PAGE (FOR PURCHASER)

PURCHASER ID : hkd2007
NAME OF PURCHASER : Hong Jil Dong
CREDIT POINT : A (93 Point)

[ LIST FOR BILL ]

| SELECT | NAME OF PACKAGE | SUPPLIER | CHARGE | PAYMENT DUE DATE | PRE-PAYMENT PRICE LIMIT | VAT | PAYMENT METHOD | VIEW DETAIL |
|---|---|---|---|---|---|---|---|---|
| ☐ | PHILIPPINE TOUR | ABC TOUR | ₩800,000 | ~2/26 | ₩700,000 | WITH | CASH | DETAIL |
| ☐ | LOCAL DINNER SHOW | XYZ TOUR | ₩500,000 | ~2/27 | ₩450,000 | WITH | CASH | DETAIL |
| ☐ | : | : | | | | | | |
| ☐ | | | | | | | | |
| ☐ | TOTAL | | ₩1,300,000 | | ₩1,150,000 | WITH | CASH | |

CANCEL   NEXT

SYSTEM AND METHOD FOR DIFFERENTIAL PAYMENT

TECHNICAL FIELD

The present invention relates to a differential payment system for differentially paying for a tour package based on a service evaluation data and a payment method in the differential payment system.

BACKGROUND ART

As the number of overseas/domestic travelers increases every year, the number of disputes between tour package suppliers and tour package purchasers gradually increases. Possible main disputes include touting of optional items, arbitrary service changes and omissions, peremptory sales, and unkindness. In typical systems used to pay for tour packages, a tour package purchaser completely pays for a tour package before the departure. Thus, when a tour package supplier lowers a service level at a tour site or omits a service, it is difficult for the purchaser to appropriately respond to the act of the supplier.

FIG. 1 is a block diagram illustrating a process of selecting a tour package and paying for the tour package according to a related art. Generally, a purchaser selects a tour package and a tour package supplier and confirms his/her selection through the Internet and completely pays for his/her tour package to the supplier before departure. Since the purchaser substantially pre-pays for his/her tour package, service quality at a tour site only depends on credit of the supplier. Specifically, as the number of personal tours increase, the number of direct contracts with local tour agencies increases. Thus, damages to tourists from cheap tour agencies abusing prepayment are increasing.

Although suppliers prepare local services with money paid by purchasers, typical prepayment systems have problems by a standard that a price is paid in return for a service. Thus, methods of paying for tour packages should be improved.

DISCLOSURE

[Technical Problem]

The present invention has been made in an effort to solve the above-described problems in paying for tour packages. An object of the present invention is to provide: a differential payment system for differentially paying for a tour package based on a service evaluation data of a tour package supplier and a credit evaluation data of a tour package purchaser; and a differential payment method by the differential payment system.

[Technical Solution]

To achieve the objects of the present invention, there is provided a differential payment system connected to both a supplier terminal of a supplier providing a service and a purchaser terminal of a purchaser purchasing the service through a network, the differential payment system including: a membership information registration/management module receiving membership information from the supplier terminal and the purchaser terminal; a membership information storage member for storing the membership information; a credit evaluation/management module creating a service credit information about the supplier based on the membership information about the supplier stored in the membership information storage member; a service evaluation/management module calculating a service evaluation score based on a service evaluation information input through the purchaser terminal after providing the service to the purchaser; and an installment payment price calculation module determining a ratio of a pre-installment price to a post-installment price based on the service credit information, the pre-installment price paid to the supplier before providing the service and the post-installment price paid to the supplier after providing the service being included in a service payment price paid to the supplier, the installment payment price calculation module calculating a differential post-installment price in proportion to the service evaluation score from the post-installment price after providing the service, the installment payment price calculation module transmitting an information about the pre-installment price, an information about the post-installment price, and an information about the differential post-installment price to the supplier terminal.

According to another aspect of the present invention, there is provided a method of differentially paying a price in a differential payment system connected to both a supplier terminal of a supplier providing a service and a purchaser terminal of a purchaser purchasing the service through a network, the method including: receiving, by the differential payment system, a supplier information about the supplier through the supplier terminal; calculating, by the differential payment system, a service credit point based on the received supplier information; dividing a payment price by determining, by the differential payment system, a pre-installment price paid to the supplier before providing the service and a post-installment price paid to the supplier after providing the service included in a service payment price of the service based on the service credit point, to transmit an information about the pre-installment price and an information about the post-installment price to the supplier terminal; receiving, by the differential payment system, a service evaluation data through the purchaser terminal of the purchaser purchasing the service, after providing the service, to calculate a service evaluation score; and transmitting, by the differential payment system, an information about a differential post-installment price of the post-installment price to the supplier terminal, the differential post-installment price being in proportion to the service evaluation score, to perform a post-payment.

Advantageous Effects

According to the present invention, a purchaser can easily search a tour package supplier providing a high-quality service using a differential payment system and a service evaluation system for a tour package, and the number of tour package suppliers abusing a typical pre-payment system decreases. Also, a tour package supplier tries to improve service quality because his customers' satisfaction with a local tour service is directly linked with profit and loss of the supplier.

DESCRIPTION OF DRAWINGS

FIG. 5 is a view illustrating an input screen for a bill input by a supplier.

FIG. 6 is a view illustrating an input screen on which a differential payment system requires a purchaser to approve bills in a batch based on bills presented by a plurality of suppliers.

BEST MODE

Hereinafter, the present invention will now be described in detail with reference to the accompanying drawing.

Figure 1:
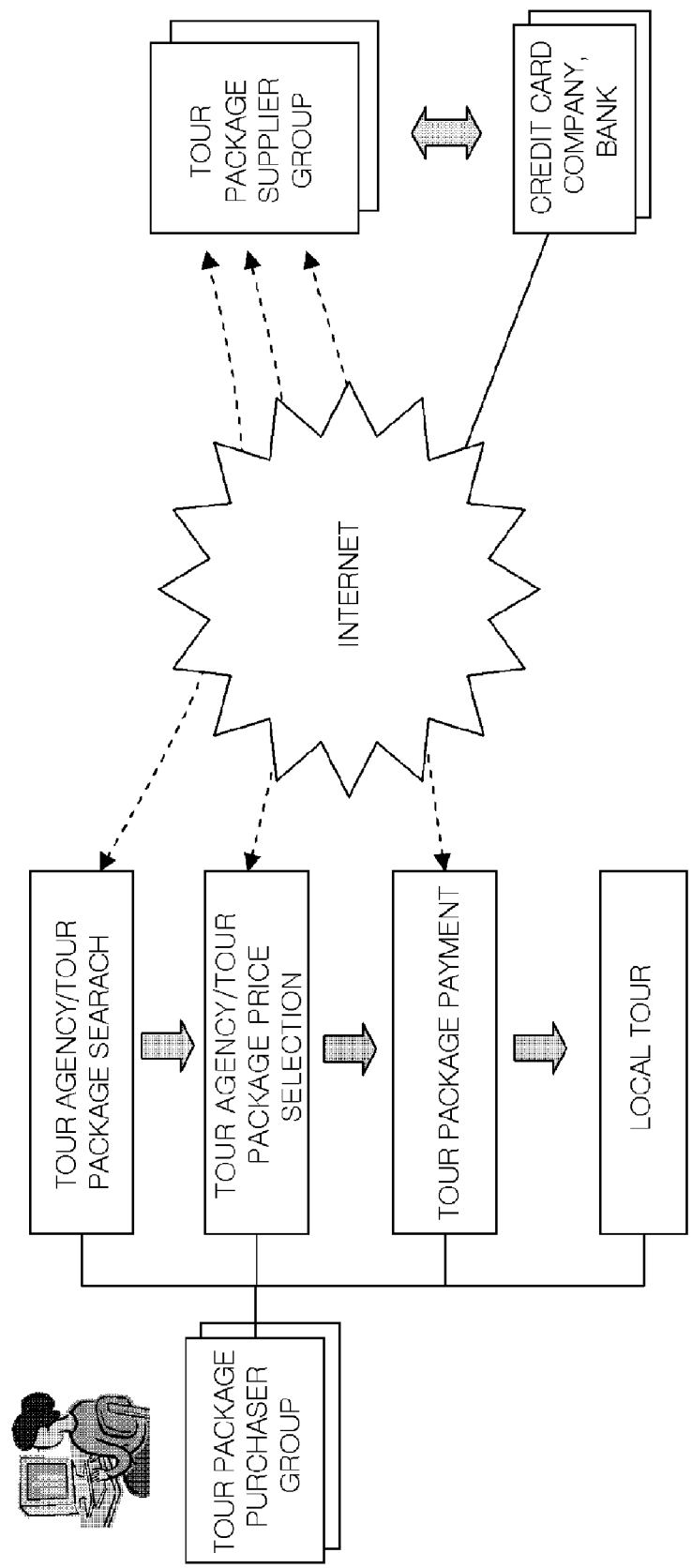
FIG. 1 is a block diagram illustrating a process of selecting a tour package and paying for the tour package according to a related art.
Figure 2:
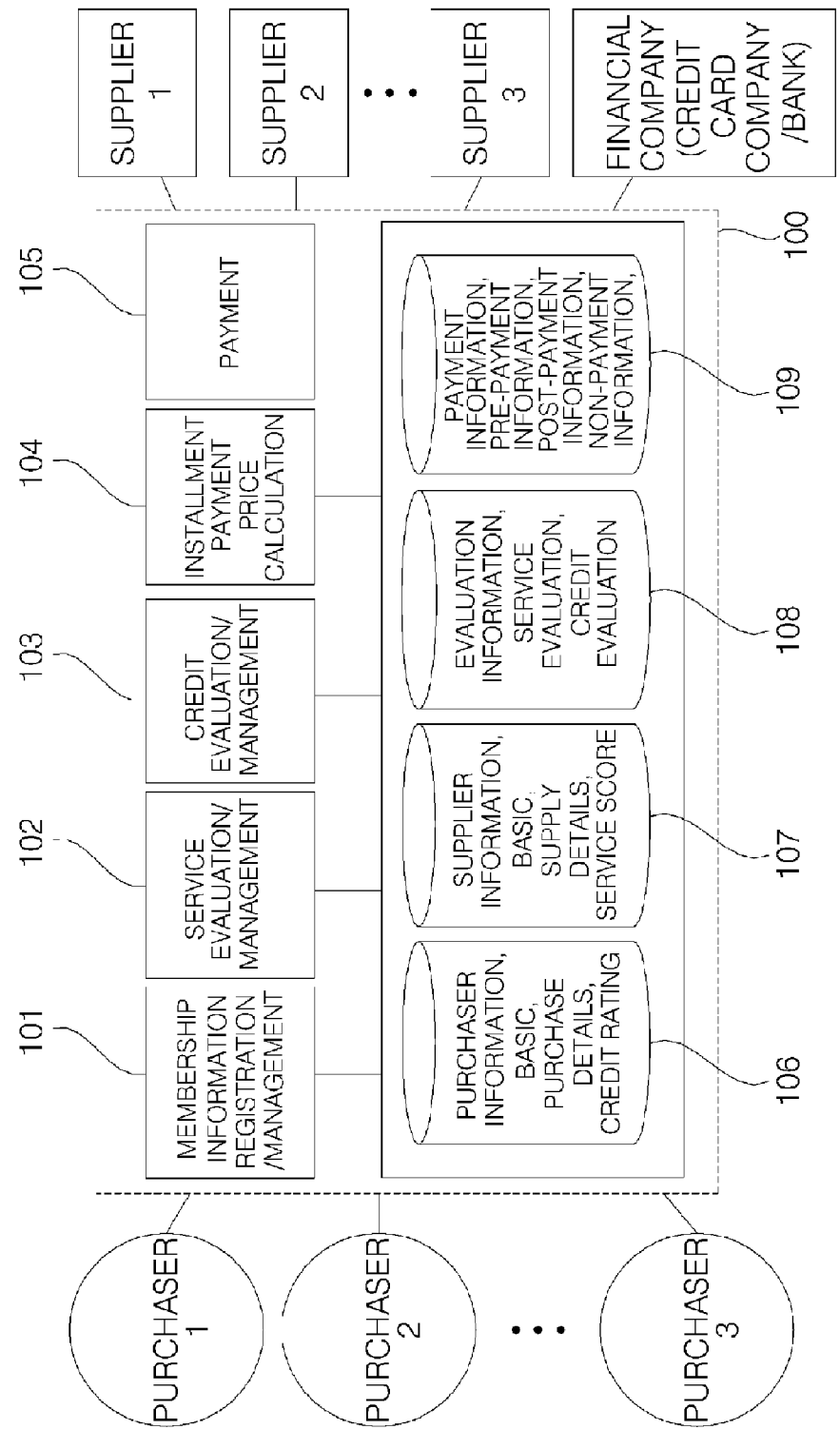
FIG. 2 is a block diagram illustrating an entire configuration according to a first embodiment of the present invention.

FIG. 2 is a block diagram illustrating an entire configuration according to a first embodiment of the present invention.

A differential payment system 100 includes a membership information registration/management module 101 managing new registrations and edits, a service evaluation/management module 102, a credit evaluation/management module 103, an installment payment price calculation module 104, a payment module 105, a purchaser information database 106 for storing a purchaser information, a supplier information database 107 for storing a supplier information, an evaluation information database 108 for storing an evaluation information, and a payment information database 109 for storing a payment information. The service evaluation/management module 102 creates a service credit information based on a membership information input through a supplier terminal of a supplier and determines a service evaluation score based on a service evaluation result input through a purchaser terminal after supplying a tour package. The credit evaluation/management module 103 creates a purchase credit based on the membership information about a purchaser input through the purchaser terminal, and updates the purchase credit based on the service evaluation result transmitted through the purchaser terminal by the purchaser. The installment payment price calculation module 104 determines a ratio of a pre-payment price to a post-payment price based on the service credit information and transmits an information about the pre-payment price and an information about the post-payment price to the supplier terminal, before providing a service. The pre-payment price is paid to the supplier before providing the service, and the post-payment price is paid to the supplier after providing the service. Also, the installment payment price calculation module 104 calculates a differential post-payment price in proportion to the service evaluation score from the post-payment price and transmits an information about the differential post-payment price to the supplier terminal, after providing the service. The payment module 105 pays the post-payment price and the differential post-payment price to the supplier in response to a payment requirement input from the supplier terminal. A personal information about the purchaser, purchase details, and a credit rating information are stored in the purchaser information database 106. A basic information about the supplier, supply details, and a service credit rating score are stored in the supplier information database 107. A service evaluation information and a credit evaluation information are stored in the evaluation information database 108. A pre-payment information, a post-payment information, and a non-payment information are stored in the payment information database 109.

The differential payment system 100 is connected, through a network including the Internet, to purchaser terminals 1, 2 through n, supplier terminals 1, 2 through n, and a computer in a financial company (a credit card company or a bank) used for payment.

Figure 3:
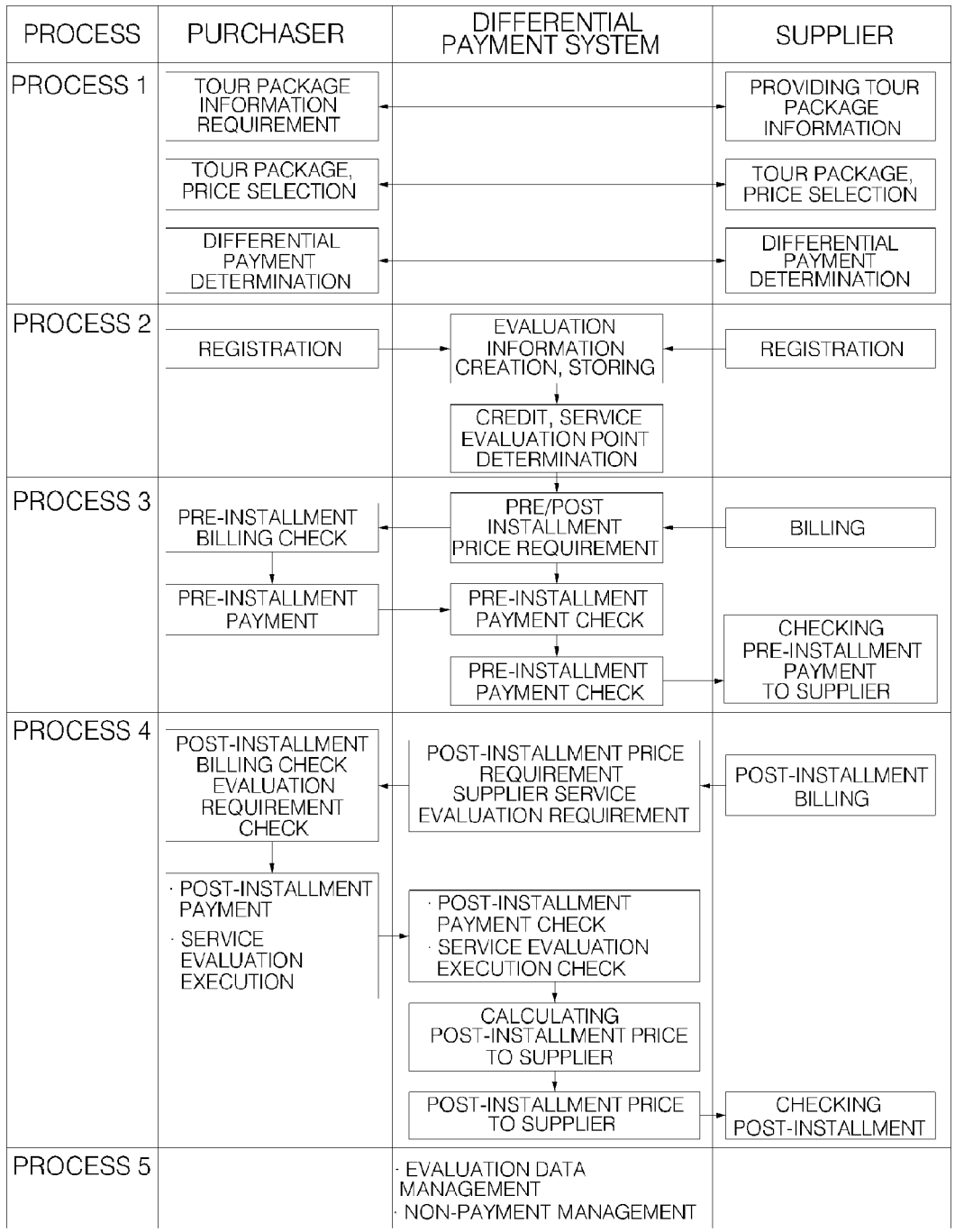
FIG. 3 is a flowchart illustrating a payment process of a differential payment system according to an embodiment of the present invention.
Figure 4:
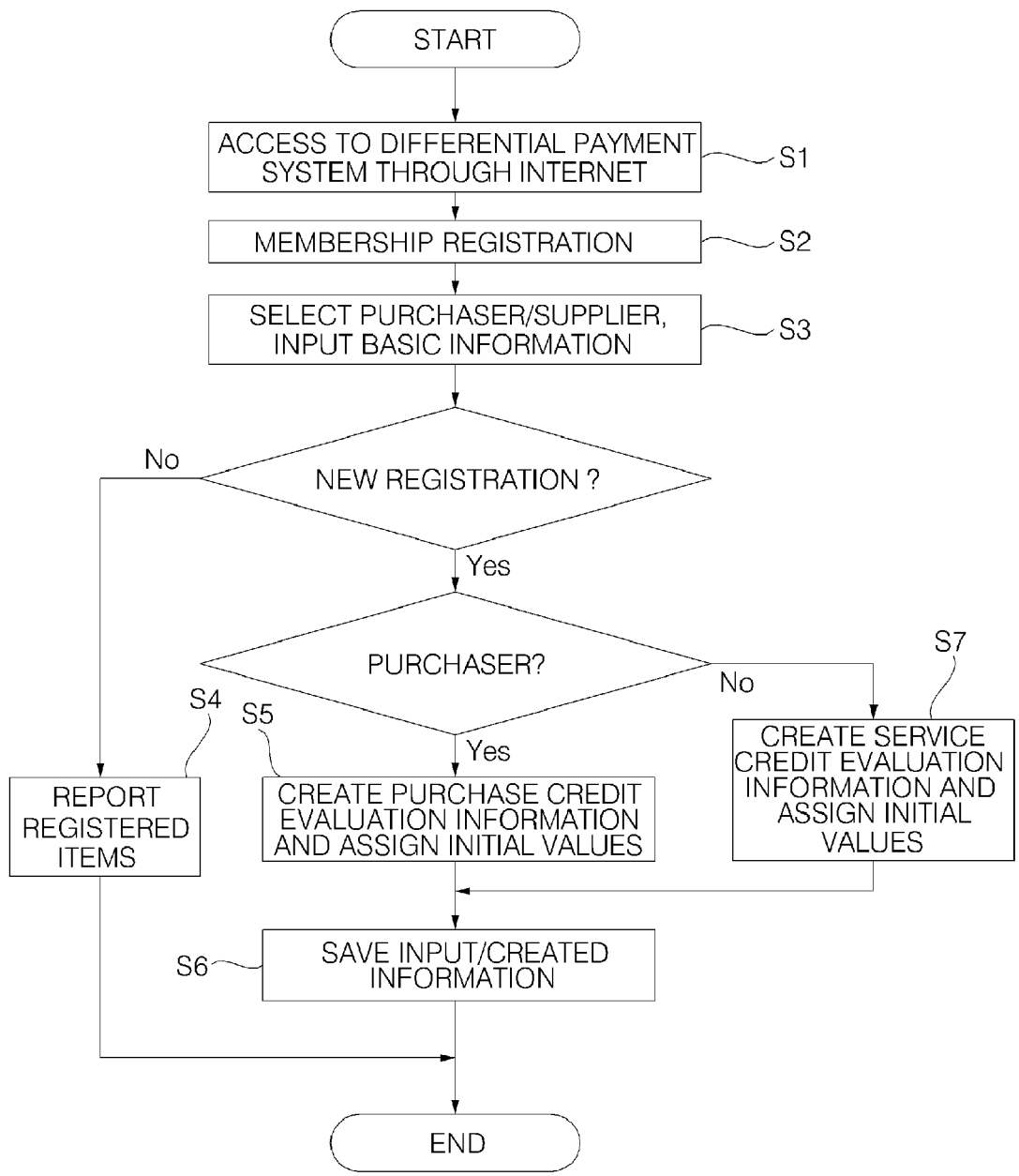
FIG. 4 is a flowchart illustrating a process in which a tour package PURCHASER and a tour package supplier are newly registered to a differential payment system according to an embodiment of the present invention.

FIG. 3 is a flowchart illustrating a payment process by a differential payment system according to an embodiment of the present invention, and FIG. 4 is a flowchart illustrating a process in which a tour package purchaser and a tour package supplier are newly registered to a differential payment system according to an embodiment of the present invention.

1) Process 1: Tour Package Search and Tour Package Determination

A tour package purchaser accesses to a supplier terminal through the Internet using a purchaser terminal or accesses to sites of suppliers registered to the differential payment system 100, to select a tour package provided by the suppliers and sign a contract such that a payment for the tour package between the supplier and the purchaser is carried out by the differential payment system 100.

2) Process 2: Registration to Differential Payment System

To carry out the payment for the package between the tour package purchaser and the supplier through the differential payment system 100, the tour package purchaser and the supplier should be registered to the differential payment system 100.

Referring to FIG. 4, a registration process will now be described. In operation S1, the purchaser and the supplier access to a web page of the differential payment system 100 using their own terminals through the Internet. In operation S2, the purchaser and the supplier select a new registration button on a first page. In operation S3, the purchaser and the supplier select a basic information including an ID, a social security number, a phone number, and an address and determine whether he/she is a purchaser or a supplier, on a registration page. In operation S4, if the differential payment system 100 identifies him/her as an existing member with reference to the social security number, registered items are reported and the registration process is completed. If he/she is identified as a new member, the differential payment system 100 creates a registration data based on the input information. At this point, if he/she is a purchaser, in operation S5, a purchase credit evaluation information is created and, in operation S6, saved. On the other hand, if he/she is a supplier, in operation S7, a service credit evaluation information is created and saved with respective assigned initial values. Main evaluation items to be created are shown in Table 1 below.

TABLE 1

Purchase Credit/Service Credit Evaluation Items

| CLASSIFICATION | | Service Item | Remark |
|---|---|---|---|
| Purchaser | Purchase Credit Evaluation Item | Registration ID | Purchaser Registration ID |
| | | Purchase Credit Point | Obtained purchase credit point |
| | | | 10 through 100 points (initial value 70 points) |
| | | | Various depending on the number of performing service evaluation and supply points |
| | | Update Date | Date on which purchase credit point is most recently obtained |
| | | The Number Of Performing Service Evaluation | The total number of performing service evaluation (default 0) |
| | | The Number Of Service Evaluation Suppliers | The number of suppliers on which service evaluation is performed |
| Supplier | Service Credit Evaluation Item | Registration ID | Supplier registration ID |
| | | Service Credit Point | Obtained service credit points |
| | | | 10 through 100 points (initial value 70 points) |
| | | | Various depending on service evaluation points determined by purchasers |
| | | Update Date | Date on which service credit point is most recently obtained |
| | | The Number Of Receiving Service Evaluation | The number of receiving service evaluation |
| | | The Number Of Service Evaluation Purchasers | The number of purchasers performing service evaluation |

Dealing between two purchasers and two suppliers that are newly registered to the differential payment system 100 will now be described in detail according to the first embodiment of the present invention. Each purchaser has dealing with each supplier, and a price of a tour package is one million wons.

Initial values corresponding to the purchasers and the suppliers and determined according to Table 1, are shown in Table 2 below. Seung-ho Kim and Young-hee Lee have dealing with Happy Tour and World Tour, respectively.

3) Process 3: Pre-Installment Payment

The supplier registers to and logs in the differential payment system 100 through the supplier terminal, and then requires the differential payment system 100 to approve a bill.

FIG. 5 is a view illustrating an input screen for a bill input through a supplier terminal by a supplier. The input screen includes a purchaser information, the name of a service package, a payment due date, a payment method, a service period, service details in the bill, and optional service items excluded from the bill. In here, the tour package supplier may directly

TABLE 2

Initial Values Application Of Purchaser/Supplier Differential Payment System

| CLASSIFICATION | ID | Name | Purchase Credit Point | The Number Of Performing Service Evaluation | The Numer Of Suppliers receiving Service Evaluation | Service Credit Point | The Number Of Receiving Service Evaluation | The Number Of Purchasers Performing Service Evaluation | Update |
|---|---|---|---|---|---|---|---|---|---|
| Purchaser | kim001 | Seung-ho Kim | 70 | 0 | 0 | — | — | — | Jan. 1, 2007 |
| Supplier | happy001 | Happy Tour | — | — | — | 70 | 0 | 0 | Jan. 6, 2007 |
| Purchaser | lee002 | Young-hee Lee | 70 | 0 | 0 | — | — | — | Jan. 5, 2007 |
| Supplier | world002 | World Tour | — | — | — | 70 | 0 | 0 | Jan. 8, 2007 |

Each of the purchase credit points is used as a reference for determining a pre-payment price and a post-payment price that are paid by the purchaser. Each of the service credit points is used as a reference for determining a ratio of a pre-installment price to a post-installment price, which are paid to the supplier by the differential payment system 100.

offers a pre-installment price, but the offered pre-installment price should be equal to or less than a pre-installment price determined based on a service credit point.

When the differential payment system 100 receives the bill presented by the supplier, the differential payment system 100 calculates pre/post-installment prices.

References for calculating rates of the supplier pre/post-installment prices based on the service credit points of the suppliers and the rates of the supplier pre/post-installment prices are shown in Table 3 below.

TABLE 3

Rates Of Pre/Post-installment Prices Based On Service Credit Point And Applications

| Service Credit Point (point) | Level | Rate of pre-installment (%) | rate of post-installment (%) | total (%) | Application |
|---|---|---|---|---|---|
| 95-100 | A+ | 90 | 10 | 100 | 1) Happy Tour (Total: one million wons) |
| 90-95 | A | 87 | 13 | 100 | Service Credit Point: 70 points |
| 85-90 | B+ | 84 | 16 | 100 | Pre-installment price: 7.5 million wons |
| 80-84 | B | 81 | 19 | 100 | Post-installment price: 2.5 million wons |
| 75-79 | C+ | 78 | 22 | 100 | 2) World Tour (Total: one million wons) |
| 70-74 | C | 75 | 25 | 100 | Service Credit Point: 70 points |
| 65-69 | D+ | 72 | 28 | 100 | Pre-installment price: 7.5 million wons |
| 60-64 | D | 69 | 31 | 100 | Post-installment price: 2.5 million wons |
| 55-59 | E+ | 66 | 34 | 100 | |
| 50-54 | E | 63 | 37 | 100 | |
| below 50 | F | 60 | 40 | 100 | |

According to Table 3 with the applications, Happy Tour and World Tour each receives 7.5 million wons, and the balances of 2.5 million wons are differentially paid based on service results of the two suppliers.

When the supplier inputs data and then presses a requirement button, the installment payment price calculation module 104 of the differential payment system 100 creates a pre-payment bill payment requirement data to the purchaser based on a bill data input by the supplier and the purchase credit point. Rates of the pre-payment prices of the purchasers are differentially determined depending to purchase credits of the purchasers. The rates (%) of the pre-payment prices of the purchasers depending on the purchase credits and applications are shown in Table 4 below.

TABLE 4

Rates (%) Of Pre-Payment Prices Of Purchasers Depending On Purchase Credits And Applications

| Purchase Credit Point (point) | Level | Rate Of Pre-Payment (%) | Applications |
|---|---|---|---|
| 95-100 | A+ | The same as that of pre-installment of supplier | 1) Seung-ho Kim |
| 90-95 | A | Rate of pre-installment of supplier (%) + Rate of Post-installment of supplier (%) × 0.25 | Purchase Credit Point: 70 points Credit Level: C |
| 85-90 | B+ | Rate of pre-installment of supplier (%) + Rate of post-installment of supplier (%) × 0.50 | Rate Of Pre-Payment: 100% 2) Young-hee Lee |
| 80-84 | B | Rate of pre-installment of supplier (%) + Rate of post-installment of supplier (%) × 0.75 | Purchase Credit Point: 70 points Credit Level: C |
| 75-79 | C+ | Total Bill of 100% | Rate Of Pre-Payment: 100% |
| 70-74 | C | | |
| 65-69 | D+ | | |
| 60-64 | D | | |
| 55-59 | E+ | | |
| 50-54 | E | | |
| below 50 | F | | |

When a plurality of tour package suppliers including: a tour package supplier dealing in airline tickets, hotels, and local traffics; and a tour package supplier dealing in local leisure events bill a purchaser, the differential payment system 100 creates a bill data such that the purchaser selects bills to pay the bills in a bundle. FIG. 6 is a view illustrating a batch-billing page presented by a plurality of suppliers. When a purchaser approves a bill after logging in the differential payment system 100, the differential payment system 100 checks and reports a payment result to a terminal of each supplier, and then pays pre-installment prices presented by the suppliers. According to this example, the differential payment system 100 sends 7.5 million wons to each Happy Tour and World Tour.

4) Process 4: Post-Installment Payment

When tour service periods input in the differential payment system 100 are over, and the purchasers log in the differential payment system 100 through the purchaser terminals, the differential payment system 100 provides post-payment bills and a supplier service evaluation input page to the purchaser terminals. When the two purchasers pay the pre-payment prices of 100%, the purchasers executes only the supplier service evaluation input page.

If the purchasers do not execute the supplier service evaluation input page within a predetermined period, a default value is selected. The differential payment system 100 calculates differential post-installment prices to be paid to the suppliers based on service evaluation result data according to an evaluation method as shown in Table 5 below.

TABLE 5

Supplier Service Evaluation Items and Evaluation Method

| Classification | | Service Item | Weight | Evaluation Method |
|---|---|---|---|---|
| (1) Observance Index in Service | Observance Index in Pre-notified Service | Guide/Local Pickup Service | 10 | Excellent: 10 points |
| | | Hotel Service: Pre-notified Hotel Usage, Check-in, and Check-out | 40 | Pretty Good: 8 points Good: 7 points Fair: 6 points |
| | | Observance of Itinerary | 30 | Poor: 5 points |
| | | Pre-notified Free Service | 20 | Bad: 3 points |
| (2) Purchaser Satisfaction Index | Satisfaction Index expressed by Purchaser | Consultation and Information (Previous/Local) | 10 | |
| | | Comfortableness of Itinerary (Consideration for Purchaser) | 30 | |
| | | Local Traffic and Reservation | 20 | |
| | | Whole Service for Price | 40 | |
| Weakness index in Service | Point Deduction: Deducted from Sum of (1) and (2) | Touting of Non-notified Optional Item | −2 | The number of evaluation *Weight*Price Weight [note 1] |
| | | Peremptory sale | −2 | |
| | | Unkindness (Supplier and Guide) | −2 | Over Good: 0 point Improvement Recommend: 0.5 point |
| | | Dissatisfaction/No Response to Suggestion | −1 | Improvement Need: 1.0 point Measure Need: 2.0 points |

[Note 1] Price Weight: Expense Caused by Touting, Below 0.1 million wons: 1 point, and 0.2 point increase per 0.1 million wons increase.

When the purchaser completes the supplier service evaluation input page through the purchaser terminal, the service evaluation/management module 102 of the differential payment system 100 calculates a service evaluation score for the corresponding supplier based on an input data. Applications of an evaluation data of the two purchasers and service evaluation scores obtained by Happy Tour and World Tour based on the evaluation data are shown in Table 6 below.

According to the application, Happy Tour and World Tour obtained a service evaluation score of 92 points and a service evaluation score of 71 points, respectively. The differential post-installment prices are calculated based on the service evaluation scores. A method of calculating the differential post-installment prices based on the service evaluation scores and the purchase credit point (level) is shown in Table 7 below.

TABLE 6

Application of Service Evaluation Score

| Supplier | | Service | Obtained Score | Weight | Total | Conversion Score 100 | Evaluator |
|---|---|---|---|---|---|---|---|
| Happy Tour | Observance Index in Service | Guide/Local Pickup Service | 10 | 10 | 100 | 5 | Seung-ho Kim |
| | | Hotel Service | 10 | 40 | 400 | 20 | |
| | | Observance of Itinerary | 10 | 30 | 300 | 15 | |
| | | Pre-notified Free Service | 10 | 20 | 200 | 10 | |
| | Purchaser Satisfaction Index | Consultation and Information | 8 | 10 | 80 | 4 | |
| | | Comfortableness of Itinerary | 8 | 30 | 240 | 12 | |
| | | Local Traffic and Reservation | 10 | 20 | 200 | 10 | |
| | | Whole Service for Price | 8 | 40 | 320 | 16 | |
| | Weakness index in Service | Touting of Non-notified Optional Item: None | =0 × (−2) × 1 | | 0 | 0 | |
| | | Peremptory sale: None | =0 × (−2) × 1 | | 0 | 0 | |
| | | Unkindness: Good | =0 × (−2) | | 0 | 0 | |
| | | Dissatisfaction/No Response to Suggestion: Good | =0 × (−1) | | 0 | 0 | |
| | Total | | 74 | 200 | 1,840 | 92 | |
| World Tour | Observance Index in Service | Guide/Local Pickup Service | 10 | 10 | 100 | 5 | Young-hee Lee |
| | | Hotel Service | 10 | 40 | 400 | 20 | |
| | | Observance of Itinerary | 8 | 30 | 240 | 12 | |
| | | Pre-notified Free Service | 8 | 20 | 160 | 8 | |
| | Purchaser Satisfaction Index | Consultation and Information | 8 | 10 | 80 | 4 | |
| | | Comfortableness of Itinerary | 6 | 30 | 180 | 9 | |
| | | Local Traffic and Reservation | 8 | 20 | 160 | 8 | |
| | | Whole Service for Price | 6 | 40 | 240 | 12 | |
| | Weakness index in Service | Touting of Non-notified Optional Item: 1 time × 0.1 million wons | =1 × (−2) × 1 | | −2 | −2 | |
| | | Peremptory sale: 1 time × 0.1 million wons | =1 × (−2) × 1 | | −2 | −2 | |
| | | Unkindness: Improvement Need | =1 × (−2) | | −2 | −2 | |
| | | Dissatisfaction/No Response to Suggestion: Improvement Need | =1 × (−1) | | −1 | −1 | |
| | Total | | 68 | 200 | 1,553 | 71 | |

TABLE 7

Calculating of Differential Post-Installment Prices Based on Service Evaluation Scores and Purchaser Credit

| Service Evaluation Score (point) | Evaluation Payment Rate(a) | Purchaser Credit (Level) | Credit Payment Rate (b) | Calculating of Post-installment price |
|---|---|---|---|---|
| over 80 | 1.0 | over A | 1.0 | =Post-installment total |
| 75-79 | 0.9 | B+ | 0.9 | price (c) × Evaluation |
| 70-74 | 0.8 | B | 0.8 | Payment Rate(a) + β |
| 65-69 | 0.7 | C+ | 0.7 | *β: c × (1 − a) × |
| 60-64 | 0.6 | C | 0.6 | (1 − b) |
| 55-59 | 0.5 | D+ | 0.5 | |
| 50-54 | 0.4 | D | 0.4 | |
| 40-49 | 0.3 | E+ | 0.3 | |
| below 40 | 0.2 | E | 0.2 | |
| | | below F | 0.1 | |

Referring to Table 7, the differential post-installment prices are 2.5 million wons (=2.5 million wons (c)×1.0(a)+0 (β)) for Happy Tour and 2.2 million wons (=2.5 million wons (c)*0.8+(25*0.2*0.4) for World Tour, respectively.

In order to prevent the purchaser from deliberately lowering the service evaluation score to minimize the differential post-installment price, the service evaluation score is linked with the purchase credit point of the purchaser. That is, when the service evaluation score is lowered, the purchase credit point is also lowered. Thus, when the purchaser buys a tour package later, authority and influence of the purchaser on an installment payment price are decreased.

The service credit point and the purchase credit point changed based on the service evaluation score are shown in Table 8 below.

Factors for determining the purchase credit point and the service credit point include a price linked with an evaluation score, an evaluation score distribution of a purchaser during a predetermined period, and an evaluation mean score. In this embodiment, calculation is performed based on the service evaluation score and the number of evaluating, which are the most sensitive factors.

Referring to Table 8, changed purchase credit points of the two purchasers, Seung-ho Kim and Young-hee Lee are 71 points (=70 points+1 point) and 68 points (=70 points−(1−0.8)×10), respectively. Also, changed service credit points of the two suppliers, Happy Tour and World Tour are 70.2 points (=70 points+(2*0.1)) and 69.9 points (=70 points+(−1*0.1)), respectively.

Unpaid balance, that is, the difference between the post-installment price and the differential post-installment price based on an evaluation result, is added to purchaser' mileage to be used to purchase a tour package or pay a broker fee.

Hereinafter, a second embodiment of the present invention will now be described.

According to the first embodiment, the post-installment prices are differentially paid. According to the second embodiment, a post-installment price is divided into a basic payment price and a differential payment price, thereby decreasing influence of a service evaluation score and reflecting the service credit point of a supplier in calculating of the post-installment price.

According to the second embodiment, the basic payment price is completely paid, corresponding to a basic payment rate (%), but the differential payment price is differentially calculated and paid corresponding to a differential payment rate (%) based on a service evaluation result of a corresponding tour package by a purchaser. A method of calculating the basic payment rate (%) and the differential payment rate (%) is shown in Table 9 below.

TABLE 8

Changes of Supplier and Purchaser Credit Points Based on Service Evaluation Score

| Service Evaluation Score (Top Conversion Score of 100) | Purchase Credit Point of Purchaser | Service Credit Point of Supplier | remark |
|---|---|---|---|
| 80 or more | Existing Point + a | Existing | a: 1 time (+1), 2 times (+2), 3 times or more (+3) |
| below 80 | Existing Point-b | Point + (c × d) | b: (1-Corresponding Evaluation Payment Rate) × 10 |
| | | | c: 90 points or more (+2 points) |
| | | | 80-89 points (+1 point) |
| | | | 70-79 points (−1 point) |
| | | | 60-69 points (−2 points) |
| | | | d: weight based on the number of evaluating |
| | | | 1-9 times: 0.1 |
| | | | 10-19 times: 0.2 |
| | | | 20-30: 0.3 |

TABLE 9

Calculation of Basic/Differential Payment Rates (%) of Post-Installment Price

| Item | Calculation Method |
| --- | --- |
| Basic Payment Price Rate (%) | A: (Purchase Credit Point of Purchaser/Service Credit Point of Supplier); <br> A ≧ 1.6: Basic Payment Price Rate % = 20%; <br> 0.4 < A < 1.6: Basic Payment Price Rate % = A × 0.5 × 100(%), round off for the nearest hundredth; <br> A ≦ 0.4: Basic Payment Price Rate % = 80% <br> Range of Basic Payment Price Rate: 20-80% |
| Differential Payment Price Rate (%) | '100%-Basic Payment Price Rate %' <br> Range of Differential Payment Price Rate: 20-80% |

Referring to Table 9, Happy Tour and World Tour each has a basic payment price rate of 50% and a differential payment price rate of 50%. When service evaluation scores of the both suppliers are the same as those of the first embodiment, the post-installment prices to be paid are 2.5 million wons (=12.5+(12.5×1.0+0)) for Happy Tour and 2.35 million wons (=12.5+(12.5×0.8+(12.5×0.2×0.4))) for World Tour. That is, it can be noted that influence of service evaluation by the purchaser is decreased in comparison with 2.2 million wons for World Tour according to the first embodiment.

The invention claimed is:

1. A non-transitory computer-readable medium having embodied thereon a computer program for operating a differential payment system connected to both a supplier terminal of a supplier providing a service and a purchaser terminal of a purchaser purchasing the service through a network, the computer program comprising:

a membership information registration/management module receiving membership informations from the supplier terminal and the purchaser terminal, the membership informations being stored in a membership information storage member;

a credit evaluation/management module creating a service credit information about the supplier based on the membership information about the supplier stored in the membership information storage member;

a service evaluation/management module calculating a service evaluation score based on a service evaluation information input through the purchaser terminal after providing the service to the purchaser; and an installment payment price calculation module determining a ratio of a pre-installment price to a post-installment price based on the service credit information, the pre-installment price paid to the supplier before providing the service and the post-installment price paid to the supplier after providing the service being included in a service payment price paid to the supplier, the installment payment price calculation module calculating a differential post-installment price in proportion to the service evaluation score from the post-installment price after providing the service, the installment payment price calculation module transmitting an information about the pre-installment price, an information about the post-installment price, and an information about the differential post-installment price to the supplier terminal.

2. The non-transitory computer-readable medium of claim 1, wherein the service credit information about the supplier is updated in proportion to the service evaluation score.

3. The non-transitory computer-readable medium of claim 1, wherein the service evaluation/management module creates a purchaser credit information based on the membership information about the purchaser stored in the membership information storage member and updates the purchaser credit information in proportion to the service evaluation score, and the installment payment price calculation module differentially calculates a pre-payment price paid by the purchaser before providing the service and a post-payment price paid by the purchaser after providing the service based on the purchaser credit information.

4. A method of differentially paying a price in a differential payment system connected to both a supplier terminal of a supplier providing a service and a purchaser terminal of a purchaser purchasing the service through a network, the method comprising: receiving, by the differential payment system, a supplier information about the supplier through the supplier terminal;

calculating, by the differential payment system, a service credit point based on the received supplier information;

dividing a payment price by determining, by the differential payment system, a pre-installment price paid to the supplier before providing the service and a post-installment price paid to the supplier after providing the service included in a service payment price of the service based on the service credit point, to transmit an information about the pre-installment price and an information about the post-installment price to the supplier terminal;

receiving, by the differential payment system, a service evaluation data through the purchaser terminal of the purchaser purchasing the service, after providing the service, to calculate a service evaluation score; and transmitting, by the differential payment system, an information about a differential post-installment price of the post-installment price to the supplier terminal, the differential post-installment price being in proportion to the service evaluation score, to perform a post-payment.

5. The method of claim 4, further comprising updating, by the differential payment system, the service credit point of the supplier in proportion to the service evaluation score.

6. The method of claim 4, further comprising:

receiving, by the differential payment system, a purchaser information about the purchaser through the purchaser terminal;

calculating, by the differential payment system, a purchase credit of the purchaser based on the purchaser information;

calculating, by the differential payment system, a pre-payment price paid by the purchaser before providing the service based on the purchase credit and a post-payment price paid by the purchaser after providing the service, to transmit an information about the pre-payment price and an information about the post-payment price to the purchaser terminal;

receiving payment of the pre-payment price before providing the service and receiving payment of the post-payment price after providing the service, by the differential payment system; and receiving, by the differential payment system, the service evaluation data, to update the purchase credit of the purchaser.

\* \* \* \* \*